April 9, 1968   SHIGERU MAEHARA ET AL   3,377,057
APPARATUS FOR RECOVERING WASTE GAS FROM OXYGEN
TOP BLOWING CONVERTER IN UNBURNT STATE
Filed Nov. 1, 1963

INVENTORS
SHIGERU MAEHARA
ISOJI IGARASHI
AKIRA ITO

BY Wenderoth, Lind & Ponack
ATTORNEYS

United States Patent Office 3,377,057
Patented Apr. 9, 1968

3,377,057
APPARATUS FOR RECOVERING WASTE GAS FROM OXYGEN TOP BLOWING CONVERTER IN UNBURNT STATE
Shigeru Maehara, Isoji Igarashi, and Akira Ito, Kitakyushu, Japan, assignors to Yawata Iron & Steel Co., Ltd., and Yokoyama Engineering Co., Ltd., Tokyo, Japan, a corporation of Japan
Filed Nov. 1, 1963, Ser. No. 320,739
3 Claims. (Cl. 266—15)

ABSTRACT OF THE DISCLOSURE

An apparatus for recovering waste gas generated in the operation of an oxygen top blowing converter in an unburnt state comprising a cooler for mounting closely above the top of a converter, a gas pipe connected with said cooler and for connection to a gas holder, a suction blower in the gas pipe for inducing the waste gas coming through said cooler and pipe into the gas holder, a detecting and converting mechanism connected to the cooler for detecting the fluctuation in gas flow rate and converting the detected gas flow rate to an electric signal having a fluctuating value, a discriminating mechanism for separating said electric signal into a high frequency component and a low frequency component, and two gas flow regulator dampers in said gas pipe, one being coupled to the high frequency component output of said discriminating mechanism and regulating the gas flow rate in response to the high frequency component and the other being coupled to the low frequency component output of said discriminating mechanism and regulating the gas flow rate in response to the low frequency component.

---

This invention relates to an apparatus for recovering waste gas generated in the operation of a metal refining furnace, particularly of an oxygen top blowing converter.

It is well known that a large amount of waste gas rich in CO gas is generated when blowing oxygen into the oxygen top blowing converter. Hitherto, many experiments have been made to recover this valuable waste gas in an unburnt state, and as a result thereof the recovery of waste gas from the oxygen top blowing converter has already reached the stage of industrialization.

However, when recovering the waste gas generated in the operation of an oxygen top blowing converter in an unburnt state strict precautionary measures must be taken against the danger of possible explosion of waste gas, because the concentration of CO gas contained therein reaches as high as 70 to 90% by volume. Particularly, when using an apparatus for recovering waste gas provided with a cooler closely mounted over the top of the converter, in which apparatus the waste gas coming from the top of the converter is cooled in the cooler and induced into the gas holder by means of a suction blower through a pipe connected with the cooler, there exists a great danger of the open air entering into the waste gas recovery apparatus through the gap between the cooler and the top of the converter, thereby causing an explosion of waste gas.

Several measures have been suggested to prevent the open air from entering into the recovery apparatus through the gap between the cooler and the top of the converter to secure the safety in the operation of recovering the waste gas. The inventors have found that one of the most effective measures therefor was to regulate the hood pressure so that it is a slightly positive pressure so as to permit the waste gas to leak out into the atmosphere. On the basis of this finding the inventors have accomplished a method of regulating the hood pressure by detecting the fluctuations in gas flow rate, discriminating the various components of gas flow and regulating the gas flow regulator valves installed in a gas flue in the waste gas recovery system according to the discriminated components of gas flow.

In regulating the hood pressure, attention is to be given to the fact that the blowing of oxygen in the operation of the oxygen top blowing converter is carried out in a periodical cycle of 20 to 30 minutes and consequently the flow rate of waste gas generated thereby varies according to the periodicity of the oxygen blowing. As the fluctuation in the flow rate of waste gas will have a decisive effect on the hood pressure, the regulation of the hood pressure should be performed in compliance with the periodical cycle of gas flow rate.

However, by a minute analysis of the fluctuation wave curve of the gas flow rate made by the inventors it was found out that on the flow rate curve in a half cycle of 20 to 30 minutes there is superimposed another flow rate curve of very small amplitude having a cycle of several seconds. Hereinafter, the fluctuation in gas flow rate of a half cycle of 20 to 30 minutes will be referred to as "the low frequency flow fluctuation" and that of a cycle of several seconds will be referred to as "the high frequency flow fluctuation." Therefore, if the regulation of the hood pressure were to be carried out only on the basis of the low frequency flow fluctuation, no precise regulation thereof could be expected. Also the high frequency flow fluctuation should be taken into consideration in regulating the hood pressure in order to keep the latter at the pre-determined constant pressure.

The object of the present invention is to provide an apparatus for regulating the hood pressure, in which the fluctuation wave of gas flow rate is separated into two kinds of components, and the gas flow is regulated by means of the gas flow regulator valves, which are automatically controlled according to the aforesaid two kinds of fluctuation waves.

Another object of the present invention is to provide an apparatus for regulating the hood pressure, by which a precise regulation of the hood pressure may be obtained.

Other objects of the present invention will be made clear from the following description and in reference to the accompanying drawings.

The present invention will be explained in detail in reference to the accompanying drawings.

Figure 1:
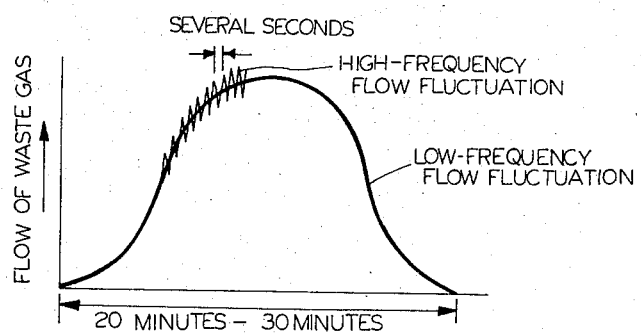
FIGURE 1 is a diagram of the fluctuation waves of flow rates of waste gas generated in the operation of the oxygen top blowing converter.

As shown in FIGURE 1, the actual flow rate of the waste gas generated in the operation of the oxygen top blowing converter is composed of two kinds of waves, that is, a wave of a half cycle of 20 to 30 minutes, which is called the low frequency flow fluctuation, and a wave having a small cycle of several seconds duration, which is called the high frequency flow fluctuation. We can assume that a smooth wave of large amplitude of the gas flow rate is modified by sharp waves of small amplitude.

Figure 2:
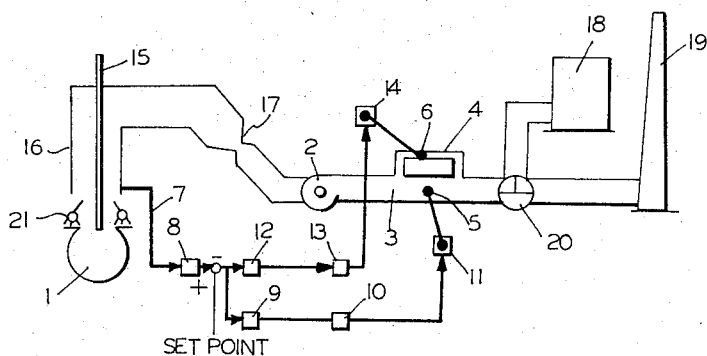
FIGURE 2 is a schematic view of one embodiment of the present invention.

In the embodiment of the present invention shown in FIGURE 2, the waste gas generated by blowing oxygen through a lance 15 into a converter 1 is led into a cooler 16 in an unburnt state, while being protected from contact with the open air by means of a sealing mechanism 21, and the waste gas cooled in the cooler 16 is sucked by a suction blower 2 through a dust collector 17. Only the effective waste gas rich in CO content is recovered in a gas holder 18 by means of a three-way switching valve 20, while the waste gas poor in CO content which is generated in the initial and final stages of the oxygen blowing, is discharged into the open air through a gas flue 19 by means of said three-way switching valve 20. In the aforesaid gas recovery system, the hood pressure of the waste gas is detected and converted to an electrical signal having a fluctuating value by means of a pipe 7 for detecting the pressure and a transmitter 8. The electrical value is compared with the set point of the hood pressure. There are two kinds of filters for eliminating the frequencies, that is, 9 is a low pass filter for eliminating the high frequency and 12 is a high pass filter for eliminating the low frequency. Thus, the fluctuating gas flow rate which is detected and converted to the electric signal, is separated into a high frequency part on the one side and a low frequency part on the other side by means of filters 9 and 12. That is to say, by means of the filter 9 for eliminating the high frequency the gas flow rate composed only of the low frequency component is transmitted to a controller 10, and by means of the filter 12 for eliminating the low frequency the gas flow rate of the high frequency component is transmitted to a controller 13. In the controllers 10 and 13 the deviation of the detected electric fluctuation value of each component from the set value is differentiated or integrated according to the conditions, thereby to give instructions to actuators 11 and 14 respectively. According to the instructions dispatched from the controllers 10 and 13 the actuator 11 regulates the degree of opening of a main flow regulator damper 5, which is installed in a main gas pipe 3 connected to the suction blower 2, to regulate the gas flow rate in response to the low frequency component while the actuator 14 regulates the degree of opening of an auxiliary flow regulator damper 6, which is installed in a bypass 4 diverging from the main pipe 3, to regulate the gas flow rate in response to the high frequency component. Thus, by regulating simultaneously the gas flow rate in response to the two frequency components to the set value of the gas flow rate it is possible to regulate precisely the gas flow rate in compliance with the actual fluctuation in the gas flow rate and consequently to keep the hood pressure to the predetermined constant pressure. In other words, in order to achieve the precise regulation of the gas flow rate the regulation of the low frequency flow fluctuation, that is, the regulation of the main flow rate, must be supplemented and modified by the regulation in response to the high frequency flow fluctuation. For this purpose it is necessary to provide the gas recovery system with two kinds of gas flow regulator valves, that is, the main regulator damper 5 and the auxiliary regulator damper 6 as disclosed in the present invention, because it will be unfeasible to regulate the flow in response to the fluctuations of two components by means of one regulator valve only. Thus, the apparatus according to the present invention is characterized by providing the gas recovery system with the mechanism for detecting the actual hood pressure and converting the detected value to the electric fluctuation value, the mechanism for discriminating the detected electric fluctuation value of the low frequency component and the high frequency component and the gas regulator dampers of two kinds, in which the main regulator damper regulates the flow rate in response to the low frequency component and the auxiliary regulator damper regulates the flow rate in response to the high frequency component.

In the actual operation, an increase in the amount of the waste gas coming from the converter results in a rise in the pressure within the cooler, exceeding the set value. Thus, the difference between the actual value and the set value shows a positive deviation. The regulating operation of the flow regulator dampers change according to the situation, whether the aforesaid increase in the waste gas amount, hence in the positive deviation, is slow or abrupt. In the case of a slow increase in the waste gas amount, a signal of the slowly increasing deviation is transmitted to the controller 10 through the filter 9 for eliminating the high frequency. A proportional or integral or any other accumulation is effected in the controller 10 and the accumulated value is further transmitted to the actuator 11, which gradually opens the main flow regulator damper 5, causing an increase in the amount of the waste gas to be sucked by the suction blower, thereby the pressure within the cooler is substantially reduced to the set value. In this case, as the signal of the slowly increasing deviation is eliminated by the filter 12 for eliminating the low frequency, it is not transmitted to the controller 13. Consequently, the auxiliary flow regulator damper 6 is out of the regulating operation.

On the contrary, in the case of an abrupt increase in the waste gas amount a signal of the abruptly increasing deviation is transmitted to the controller 13 through the filter 12 for eliminating the low frequency. The aforesaid accumulation is also effected in the controller 13 and the accumulated value is further transmitted to the actuator 14, which rapidly opens the auxiliary flow regulator damper 6, causing an increase in the amount of the waste gas to be sucked, thereby the pressure within the cooler is also substantially reduced to the set value. In this case, contrary to the former, the signal of the abruptly increasing deviation is eliminated by the filter 9 for eliminating the high frequency and consequently is not transmitted to the controller 10, thereby the main flow regulator damper 5 is out of the regulating operation.

Figure 3:
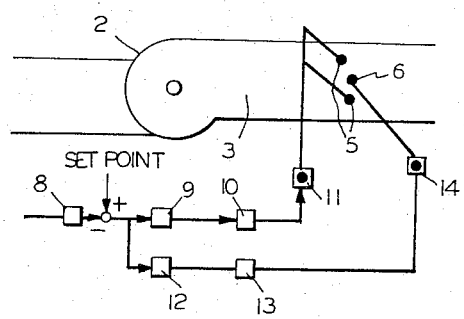
FIGURE 3 is a schematic view of another embodiment of the present invention.

FIG. 3 shows a schematic view of another embodiment of the present invention, in which in place of the main regulator damper 5 installed in the main gas pipe 3 and the auxiliary regulator damper 6 installed in the bypass 4 as shown in FIGURE 2 a louver-type gas flow device composed of dampers 5 and 6 is installed in the gas pipe 3. The louver-type damper is used in the case where the main gas pipe is of such a large capacity that it would be mechanically difficult to carry out the regulation of the gas flow rate by means of one blade only, and is composed of a plurality of blades. In FIGURE 3, the regulator damper 5 is composed of two blades which are simultaneously driven and is used for regulating the gas flow in response to the fluctuation of the low frequency component and the regulator damper 6 is composed of one blade and is used for regulating the gas flow in response to the fluctuation of the high frequency component.

However, the present invention is not limited to the modification as shown in FIGURE 3. The number of blades of the regulator dampers may be increased according to the conditions of the recovery system. Moreover, though the dampers are installed behind the suction blower in FIGURES 2 and 3, they may be also installed before the suction blower.

What we claim is:

1. An apparatus for recovering waste gas generated in the operation of an oxygen top blowing converter in an unburnt state comprising a cooler for mounting closely above the top of a converter, a gas pipe connected with said cooler and for connection to a gas holder, a suction blower in a gas pipe for inducing the waste gas coming through said cooler and pipe into the gas holder, a detecting and converting mechanism connected to the cooler for detecting the fluctuation in gas flow rate and converting the detected gas flow rate to an electric signal having a fluctuating value, a discriminating mechanism for separating said electric signal into a high frequency component and a low frequency component, and two gas flow regulator dampers in said gas pipe, one being coupled to the high frequency component output of said discriminating mechanism and regulating the gas flow rate in response to the high frequency component and the other being coupled to the low frequency component output of said discriminating mechanism and regulating the gas flow rate in response to the low frequency component.

2. An apparatus for recovering waste gas as claimed in claim 1, in which said gas pipe includes a main part and a bypass, and said other gas flow regulator damper responsive to the low frequency component is in the main part of the gas pipe and the said one gas flow regulator damper responsive to the high frequency component is in the bypass.

3. An apparatus for recovering waste gas as claimed in claim 1, in which the gas pipe has only a main part, and said other gas flow regulator damper responsive to the low frequency component comprises a plurality of simultaneously driven blades, and the said one gas flow regulator damper responsive to the high frequency component is a single blade, said blades all being in the main part of the gas pipe.

References Cited

UNITED STATES PATENTS

| | | | |
|---|---|---|---|
| 2,917,066 | 12/1959 | Bergson | 137—101.19 |
| 3,165,928 | 1/1965 | Poulos | 235—151.34 X |
| 3,218,158 | 11/1965 | Dumont-Fillon | 75—60 |

FOREIGN PATENTS 1,319,597  1/1963  France.

JOSEPH SCOVRONEK, *Primary Examiner.*